Aug. 29, 1967  F. E. MOTTER  3,338,206
COMPOSITE MARINE DOCK BUMPER
Filed May 19, 1965
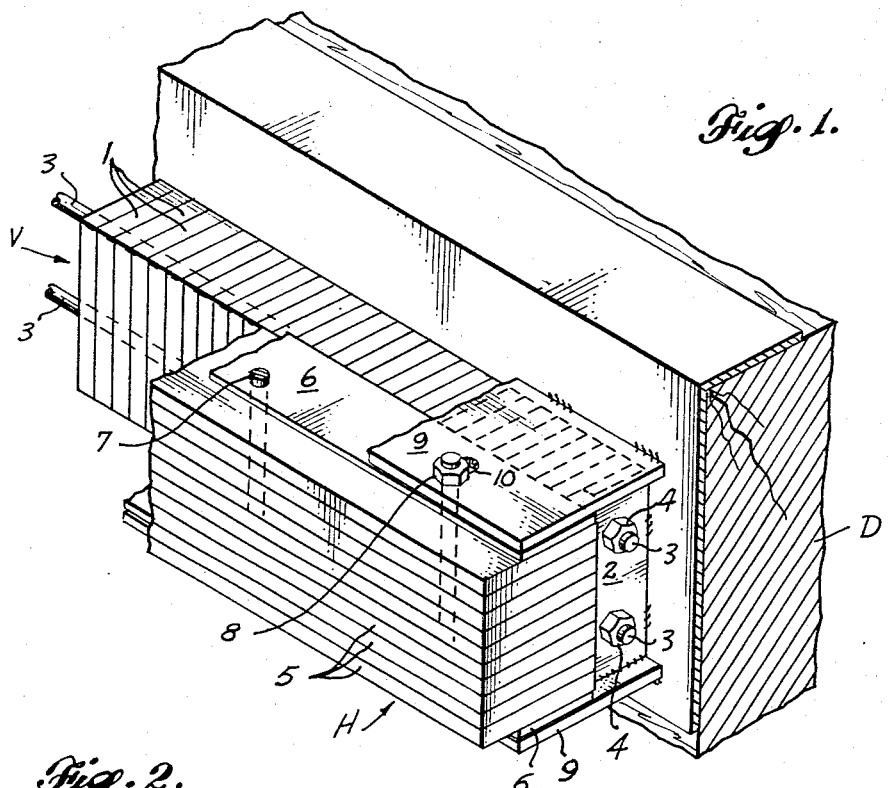
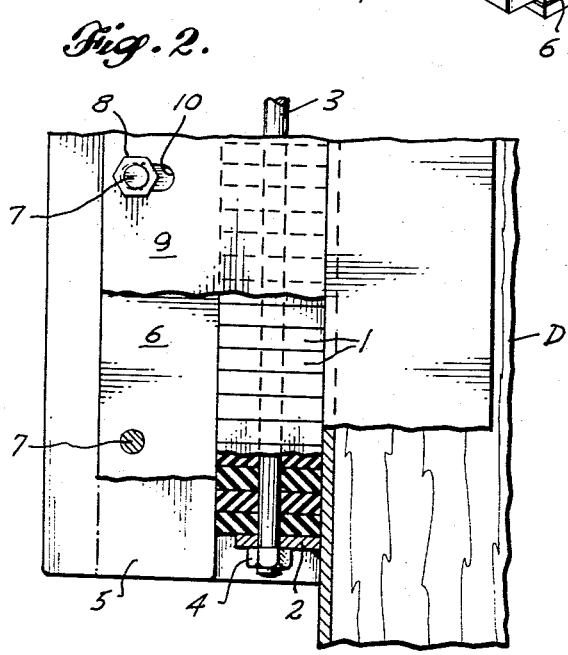
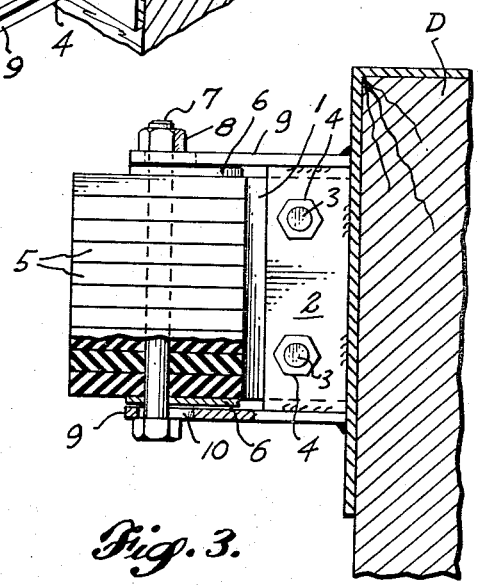
INVENTOR.
FORREST MOTTER
BY
Robert W. Beach
ATTORNEY

United States Patent Office 3,338,206
Patented Aug. 29, 1967

3,338,206
COMPOSITE MARINE DOCK BUMPER
Forrest E. Motter, New London, Ohio, assignor to Durable Mat Company, Norwalk, Ohio, a corporation of Washington
Filed May 19, 1965, Ser. No. 457,079
5 Claims. (Cl. 114—219)

ABSTRACT OF THE DISCLOSURE

Two bumper sections are made from stacks of strips cut from used tire casings and arranged with the strip widths perpendicular to a dock face. An inner section is mounted between the dock face and an outer section. The outer section receives the impact of a vessel and is movable toward the inner section in response to impact so that both sections are effective in absorbing shock. The two sections have their strip edges abutting in edge-to-edge crossing relationship.

---

Marine dock bumpers have been made of stacked rubber strips cut from used tire casings and mounted on a marine dock with one edge of the rubber strips abutting the dock and the opposite edge exposed for receiving the impact of vessels approaching the dock. A principal advantage of such bumper construction is its low cost. However, the thickness of such bumpers is restricted by the width of strips which can be cut from a tire casing. It is, therefore, a principal object of the present invention to provide a marine dock bumper construction of any desired thickness while retaining the economy of employing used tire casings for the bumper material.

A further object is to provide means whereby the force of the impact of a vessel with the bumper will be effectively transmitted to the entire thickness of the bumper, thereby absorbing more of the impact shock of the vessel.

An additional object is to provide a bumper construction which is easily and quickly fabricated and which utilizes standard materials.

It is also an object to provide a dock bumper in which the flexible strips can be quickly and easily replaced without the necessity of replacing other parts of the bumper.

The foregoing objects can be accomplished by providing a marine dock bumper having two or more sections of stacked strips, such sections being disposed in adjacent relationship with the strip edges of such adjacent sections crossing and being in abutment. Each strip section is formed by securing the stacked strips between a pair of rigid plates by bolts extending through the plates and strips. The strip sections are secured together with the stacked strips in edge-to-edge abutment to form a bumper unit by mounting adjacent sections between an additional pair of plates. In order to transmit the impact of a vessel from the outer section of the bumper which it strikes to an adjacent inner strip section, the outer section is movable relative to the section-securing plates so that such section can be pushed inward against such inner section.

FIGURE 1 is a top perspective of the bumper of the present invention attached to a dock, with parts broken away.

FIGURE 2 is a plan of the bumper having parts broken away, and FIGURE 3 is an elevation having parts broken away.

The marine dock bumper unit preferably has two sections of stacked strips secured together in edge-to-edge relationship. The strips are made of resilient material, such as fabric-reinforced rubber or synthetic rubber material, and it is preferred that the strips be cut from used truck tire casings. Such casings provide inexpensive material of suitable thickness for the bumper strips.

An inner bumper section is composed of stacked strips 1, each strip having a length corresponding to the desired vertical width of the bumper. The strips 1 are secured together in face-to-face relationship between end plates 2 by two or more rods 3 having threaded ends to receive securing nuts 4. The number of strips 1 secured between plates 2 will determine the length of the bumper unit.

An outer bumper section is composed of stacked strips 5 similarly secured between end plates 6 by two or more rods 7 threaded to receive securing nuts 8. A sufficient number of strips 5 are secured together so that the resilient strip section between plates 6 is of a thickness corresponding to the vertical length of a strip 1.

The inner section of stacked strips is mounted directly on the facing of the marine dock, which may be of metal. Such section V may be disposed with its strips arranged in vertical planes, as shown best in FIGURE 1, and the section is mounted by securing the opposite end plates 2 to the dock facing by fillet welds. Above and below the bumper section V are plates 9 disposed with their planes substantially horizontal. The edges of such plates adjacent to the facing of the dock D may be secured to such facing by fillet welds. The plates 9 are of a width perpendicular to the dock facing considerably greater than the corresponding width of the bumper section V.

The outer bumper section H can be received between the projecting edges of the upper and lower plates 9. The overlapping edge portions of such plates have slots 10 receiving the bolts 7. The lengths of such slots extend perpendicular to the dock facing.

Thus, when the bumper sections V and H are secured together by attachment of the plates 2 and 9 to the dock facing, the outer edges of the strips 1 of bumper section V will be disposed substantially vertically and the inner edges of strips 5 of the bumper section H will be disposed horizontally, as shown best in FIGURE 1. Thus, the adjacent strip edges of the bumper sections are disposed in crossed relationship so as to transmit stress more effectively from the outer bumper section strips to the inner bumper section strips. Each bumper section, therefore, will provide the most effective shock-absorbing action by the impact being applied in a direction parallel to the planes of the strips in both bumper sections.

When the strips of the two bumper sections are in their relaxed unloaded condition, the bolts 7 of the outer bumper section H will be lodged in the slots 10 near their outer ends. As a vessel engages the outer side of the outer bumper section H, such section will be moved toward the dock, sliding the bolts 7 rearwardly along the slots 10 so that the inner edges of the strips 5 will press against the outer edges of the strips 1. The entire widths of the strips in the outer bumper section H and in the inner bumper section V will, therefore, be active in absorbing the shock of the vessel's impact. The end plates 2 of the inner bumper section are narrower than the horizontal width of the strips 1 when they are under maximum compressive load so that such end plates will not be engaged by the outer bumper section at any time to limit inward movement of such outer section.

I claim as my invention:
1. In a marine dock bumper, the combination of first and second bumper sections, each bumper section including stacked resilient strips and means spaced from the strip edges and extending through said strips for binding them together, and means securing together said first and second bumper sections one behind the other and arranged with strip edges of the two sections in abutting crossing relationship.
2. In the marine dock bumper defined in claim 1, the strips of one bumper section being substantially vertical and the strips of the other bumper section being substantially horizontal.

3. In a marine dock bumper, the combination of a first bumper section secured to a dock, a second bumper section located adjacent to the side of said first bumper section remote from the dock, each of said bumper sections including stacked resilient strips and means spaced from the strip edges and extending through said strips for binding them together, plate means at opposite sides of said first bumper section having edge portions secured to the dock and opposite edge portions projecting outward beyond the side of said first bumper section remote from the dock and into overlapping relationship with said second bumper section, and means mounting said second bumper section from said plate means with strip edges of said first and second sections in abutting crossing relationship.

4. In the marine dock bumper defined in claim 3, the mounting means mounting the second bumper section for movement relative to the plate means toward and away from the dock.

5. In the marine dock bumper defined in claim 4, the plate means having elongated slots therein with their lengths extending substantially perpendicular to the dock and the mounting means for the second bumper section including bolts received in such slots and movable lengthwise thereof.

References Cited

UNITED STATES PATENTS 2,799,494  7/1957  Pollock _____ 114—219 X

FOREIGN PATENTS 551,153  2/1943  Great Britain.

MILTON BUCHLER, *Primary Examiner.*

B. BELKIN, *Assistant Examiner.*